(12) United States Patent
Heiberger

(10) Patent No.: US 6,863,086 B2
(45) Date of Patent: Mar. 8, 2005

(54) UNLOADING ASSEMBLY

(75) Inventor: Jeffrey Keith Heiberger, Gadsden, AL (US)

(73) Assignee: OMYA Industries, Inc., Proctor, VT (US)

( * ) Notice: Subject to any disclaimer, the term of this patent is extended or adjusted under 35 U.S.C. 154(b) by 199 days.

(21) Appl. No.: 10/251,338

(22) Filed: Sep. 18, 2002

(65) Prior Publication Data

US 2004/0050862 A1 Mar. 18, 2004

(51) Int. Cl.[7] .................................. B67D 5/00
(52) U.S. Cl. ................ 137/615; 137/899; 222/74; 141/387; 280/838; 280/839; 105/247; 285/308
(58) Field of Search .......... 222/74, 75; 137/615–616.7, 137/899, 347, 350; 141/387–389, 231; 280/838, 839; 105/247–249; 285/308–313, 277, 362, 377, 403, 33

(56) References Cited

U.S. PATENT DOCUMENTS

| | | | | |
|---|---|---|---|---|
| 983,149 A | * | 1/1911 | Lattimer | 141/383 |
| 1,718,393 A | * | 6/1929 | Thompson | 141/18 |
| 1,798,805 A | * | 3/1931 | Peter | 222/75 |
| 2,915,081 A | * | 12/1959 | Warren | 137/899 |
| 3,278,205 A | * | 10/1966 | Barlow | 285/311 |
| 3,496,959 A | * | 2/1970 | Wolfe et al. | 137/899 |
| 3,542,068 A | * | 11/1970 | Prescott | 137/615 |
| 3,779,586 A | * | 12/1973 | Rossiter | 285/308 |
| 4,411,290 A | * | 10/1983 | Heath | 137/615 |
| 4,535,826 A | * | 8/1985 | Bell | 141/231 |
| 4,883,229 A | * | 11/1989 | Moeller | 239/587.2 |
| 4,948,179 A | * | 8/1990 | Kulikowski et al. | 285/316 |
| 6,000,428 A | * | 12/1999 | Berberat | 137/615 |

OTHER PUBLICATIONS

Cam and Groove Brochure, acknowlege as prior art.

* cited by examiner

Primary Examiner—J. Casimer Jacyna
(74) Attorney, Agent, or Firm—Amster, Rothstein & Ebenstein

(57) ABSTRACT

An unloading system includes a transport for flowable product and an unloading assembly for enabling the flowable product to be removed from the transport without requiring personnel to crawl under the transport in order to connect or disconnect the transport and the unloading assembly.

20 Claims, 5 Drawing Sheets

UNLOADING ASSEMBLY

BACKGROUND OF THE INVENTION

The present invention relates to an unloading assembly, and more particularly to an unloading assembly for use in unloading flowable material from a transport.

Railcars are commonly used for the transport of flowable materials such as a slurry, a liquid, a fine powder or the like. Such a railcar is generally cylindrical or box-like in configuration and provided at or adjacent the top thereof with a loading spout through which the flowable material may be introduced into the railcar interior and at or adjacent the bottom thereof with an unloading spout through which the flowable material may be drained from the railcar interior.

Originally railcars were unloaded from the top using standpipes which projected upwardly from the top of the railcars. However, such standpipes created numerous problems, especially during washing of the railcars, so that such upstanding standpipes are not preferred at present. The modem unloading spout is a hollow drain extending downwardly from the bottom of a railcar or like transport, the drain being spaced above the ground and substantially inwardly from both sides of the transport. Especially where the bottom of the transport is curved, the drain is typically placed at the lowest point of the bottom, this typically being substantially inward from both lateral sides of the transport. This necessitates personnel involved in the unloading procedure to crawl underneath the bottom of the railcar with a flexible hose and connect the free end of the hose to the free end of the drain and then, after the unloading procedure is completed, to again crawl underneath the railcar to separate the hose from the drain.

Thus the need remains for a mechanism for performing the unloading procedure without a person having to crawl under the railcar in order to make the necessary connections and disconnections for the unloading procedure. Such a mechanism would increase both the perceived and actual safety of the personnel involved in the unloading procedure as well as decreasing the wear and tear on the bodies and apparel of the personnel who would otherwise have to crawl under the railcars.

Some railcars include a safety cap which is normally fastened on the free end of the drain to ensure closure thereof and provide protection thereto during transport of the railcar, but removed from the drain prior to commencement of the unloading procedure and replaced thereon after termination of the unloading procedure. While such a railcar would still require personnel to crawl under the railcar to remove and replace the safety cap, this is a relatively quick and painless operation relative to the conventional unloading procedure itself.

Accordingly, it is an object of the present invention to provide an unloading assembly which can be operatively connected with a transport, and in particular the drain of a railcar, without anyone having to crawl under the transport to connect the unloading assembly with the transport.

Another object is to provide such an unloading assembly which enables an unloading procedure to be accomplished easier, faster, and with greater perceived and actual safety.

A further object is to provide such an unloading assembly which is inexpensive and simple to manufacture, use and maintain.

SUMMARY OF THE INVENTION

It has now been found that the above and related objects of the present invention are obtained in an unloading system comprising, in combination, an axially extending transport for flowable product and an unloading assembly.

The axially extending transport for flowable product includes a hollow drain extending downwardly from the bottom of the transport, and fastener-receiving means adjacent one lateral side of the transport. The drain defines a first element of an engagement means, the drain being spaced above the ground and substantially inwardly from both lateral sides of the transport.

The unloading assembly includes a rigid hollow pipe of substantial length defining a pair of opposed pipe ends and a pipe body extending between the pipe ends. One pipe end defines a manual grip, and the other pipe end defines a second element of the engagement means and a mechanism engageable with the drain to enable product communication between the interiors of the transport and the pipe. A support is secured to the pipe body adjacent the one pipe end, the support including fastener means for releasably engaging the fastener-receiving means of the transport such that the transport substantially supports the pipe body while leaving the mechanism on the other pipe end free to move in at least a vertical plane relative to the drain prior to engagement therewith. At least one pole defines a pair of opposed pole ends and a pole body extending between the pole ends substantially parallel and adjacent to the pipe body. The pole end adjacent the one pipe end defines manually operable means for rotating the pole about its longitudinal axis, and the other pole end adjacent the other pipe end defines means for rotating the second element relative to the first element, thereby to cause the second element to releasably engage the first element, whereby the first and second elements cooperatively releasably lock together the mechanism and the drain upon suitable rotation of the pole. Thus, preferably the mechanism has at least one pivotable cam operable as the second element by at least one pole, and the drain has an external peripheral groove operable as the first element, the cam and groove being configured and dimensioned to releasably engage.

In a preferred embodiment, the drain includes flow control means movable between an open orientation enabling flow of the product out of the transport via the drain and a closed orientation precluding flow of the product out of the transport via the drain. The flow control means is operatively connected to means for moving the flow control means between the open and closed orientations, the moving means being disposed adjacent the one lateral side of the transport.

Preferably the support is pivotable between a storage orientation substantially parallel to the pipe body and a use orientation substantially perpendicular to the pipe body. The pipe body has a length generally equal to the separation between the drain and the one lateral side of the transport, the pole body having a length less than that of the pipe body.

In another preferred embodiment, the other pipe end defines a pair of the second elements, and the unloading assembly has a pair of the poles, each pole having a pole body adjacent a respective side of the pipe body and means for rotating a respective one of the second elements relative to the first element, whereby the first element and the second elements cooperatively releasably lock together the mechanism and the drain upon suitable rotation of the poles.

Preferably means are provided to lock the poles together against rotation. A brace plate fixes the relative juxtaposition of the pair of poles and the pipe. Means are provided for draining flowable product from the pipe after movement of the flow control means to the closed orientation, but prior to disengagement of the mechanism and the drain.

The present invention further encompasses an unloading system formed of such an unloading assembly for use with such an axially extending transport for flowable product.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
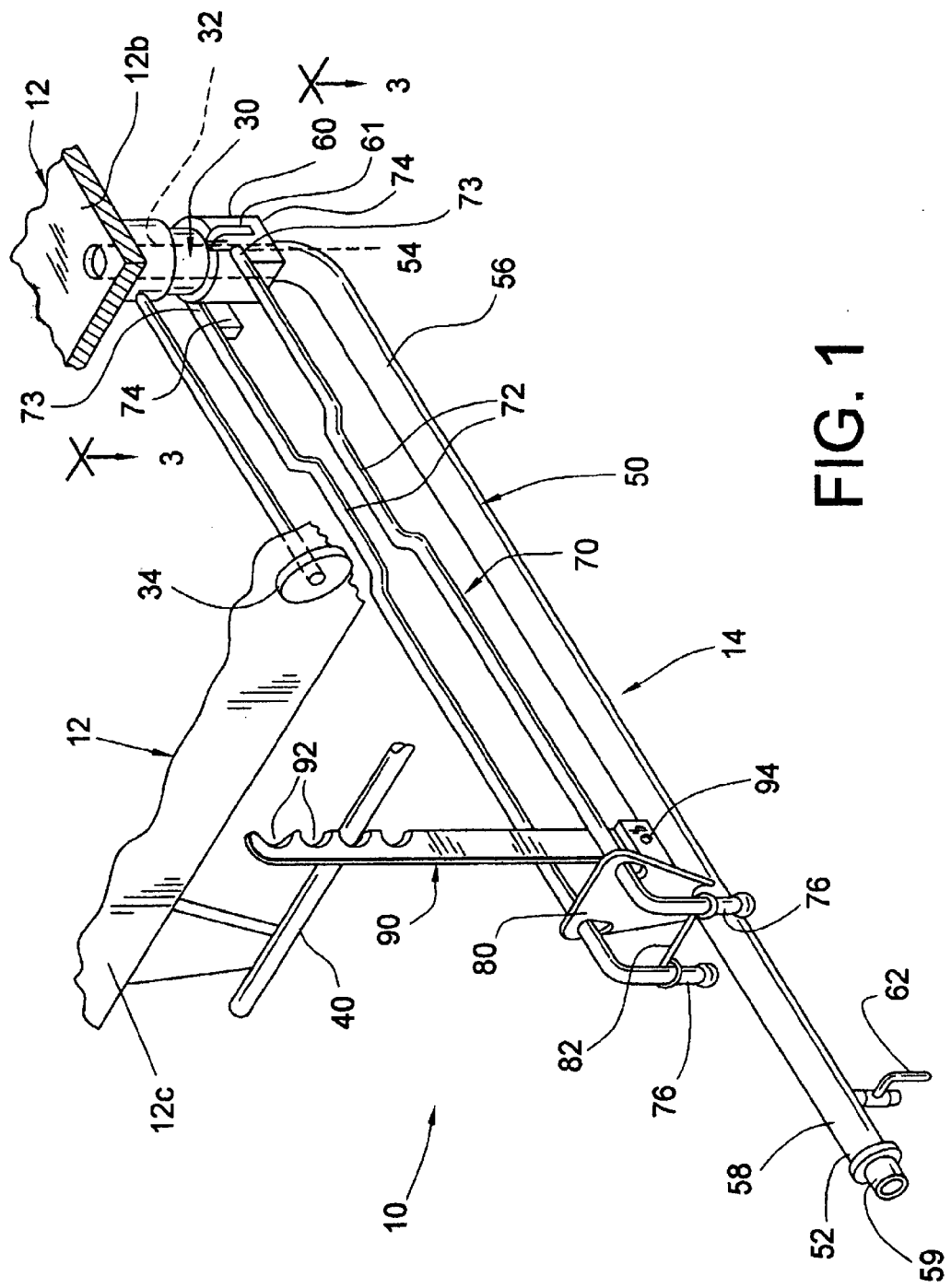
FIG. 1 is a fragmentary isometric view of an unloading system according to the present invention.

Referring now to the drawing, and in particular to FIG. 1 thereof, therein illustrated is an unloading system according to the present invention, generally designated by the reference numeral 10. The unloading system 10 comprises in combination an axially extending transport for flowable product, generally designated 12, and an unloading assembly, generally designated 14.

The transport 12 is fragmentarily illustrated as a railcar of box-like or rectangular parallelopiped configuration, but clearly other transports may be used (for example, tanker trucks) and other configurations (such as circular or oval) may be used. The transport 12 is adapted to receive, transport and discharge flowable product, whether the flowable product be a liquid, a slurry, powder or the like, and possibly even certain gases. As illustrated, the transport 12 includes a bottom 12b and a pair of horizontally spaced lateral sidewalls 12c. A plurality of wheels (not shown) support the transport bottom 12b above the ground, for example, on railroad tracks.

A hollow drain or spout, generally designated 30, communicates with the interior of the transport 10 and extends downwardly from the transport bottom 12b. The drain 30 is spaced above the ground and is located substantially inwardly from both lateral sides 12c of the transport 12. The drain 30 includes flow control means 32 movable between an open orientation enabling flow of the product out of the transport 12 via the drain 30 and a closed orientation precluding flow of the product out of the transport 12 via the drain 30. The flow control means 32 may, for example, be a conventional adjustable valve such as a wafer or butterfly valve. Operatively connected to the flow control means 32 is a means 34 (such as a wheel, as illustrated in FIG. 1, or lever) for moving the flow control means 32 between the aforementioned open and closed orientations. The moving means 34 is disposed adjacent one lateral side 12c of the transport 12 so that opening and closing of the flow control means 32, and hence the drain 30, can be achieved easily, without anyone crawling under the transport bottom 12b. The outlet end of the drain 30 is provided with a conventional male adapter 36, such as that available under the trade name CAM AND GROOVE BOSS-LOCK TYPE A ADAPTER from Salco Products of Tomball, Texas or McMaster-Carr and defining an external cam-receiving groove 42 (see FIGS. 3–5) as a first element of an engagement means.

The transport 12 additionally includes a fastener-receiving means 40 adjacent the aforementioned one lateral side 12c of the transport 12. The function of the fastener-receiving means 40 will become apparent hereinafter. The fastener-receiving means 40 may be a specialized structure added on to a conventional transport, but may also be a structural feature already found on a conventional transport and merely used for the purposes of the present invention, as will become apparent hereinafter.

Figure 2:
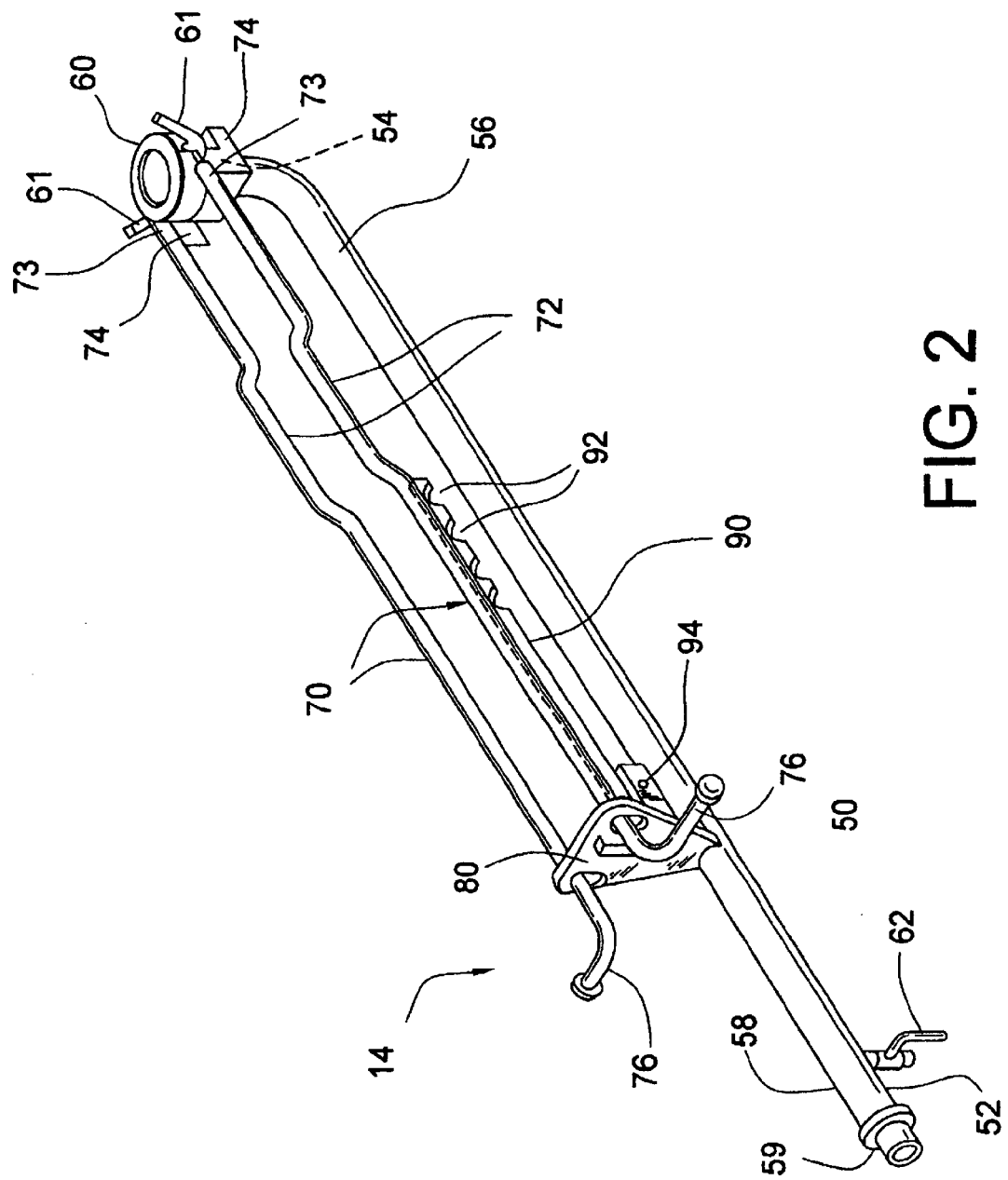
FIG. 2 is an isometric view of the unloading assembly thereof.

Referring now to FIG. 2 in particular, the unloading assembly 14 includes a lightweight, rigid hollow pipe, generally designated 50. The pipe 50 is of a substantial length generally equal to the separation between the drain 30 and the aforementioned lateral side 12c of transport 12. It defines a pair of opposed ends 52, 54 and a body 56 connecting the pipe ends 52, 54. One pipe end 52 defines a manual grip 58 to facilitate manipulation of the rigid pipe 50 by one disposed alongside the aforementioned lateral side 12c of transport 12. The grip 58 may simply be the one pipe end 52, but is preferably formed by an enlargement of the pipe diameter, by a friction surface, or other means to facilitate grasping and manipulation thereof. The other pipe end 54 defines a mechanism 60 which is engageable with the drain 30, and in particular the male adapter 36 thereof, to enable communication of the flowable product from the interior of the transport 12 into the interior of the pipe body 56. The grip end 52 of the pipe 50 is also provided with appropriate means 59 for connection to a flexible hose, rigid pipe, or other inlet to receive the flowable material during the unloading procedure.

The pipe 50 is essentially rigid so that the mechanism end 54 may be positioned by movement of the grip end 52. The composition of the pipe 50 must, of course, be compatible with the product intended to flow therethrough. Depending upon the nature of the flowable product, materials such as metals, especially aluminum, plastics (whether natural or synthetic) or the like may be employed in appropriate thicknesses to provide the desired degree of rigidity while leaving the pipe sufficiently lightweight for ease of handling.

Figure 3:
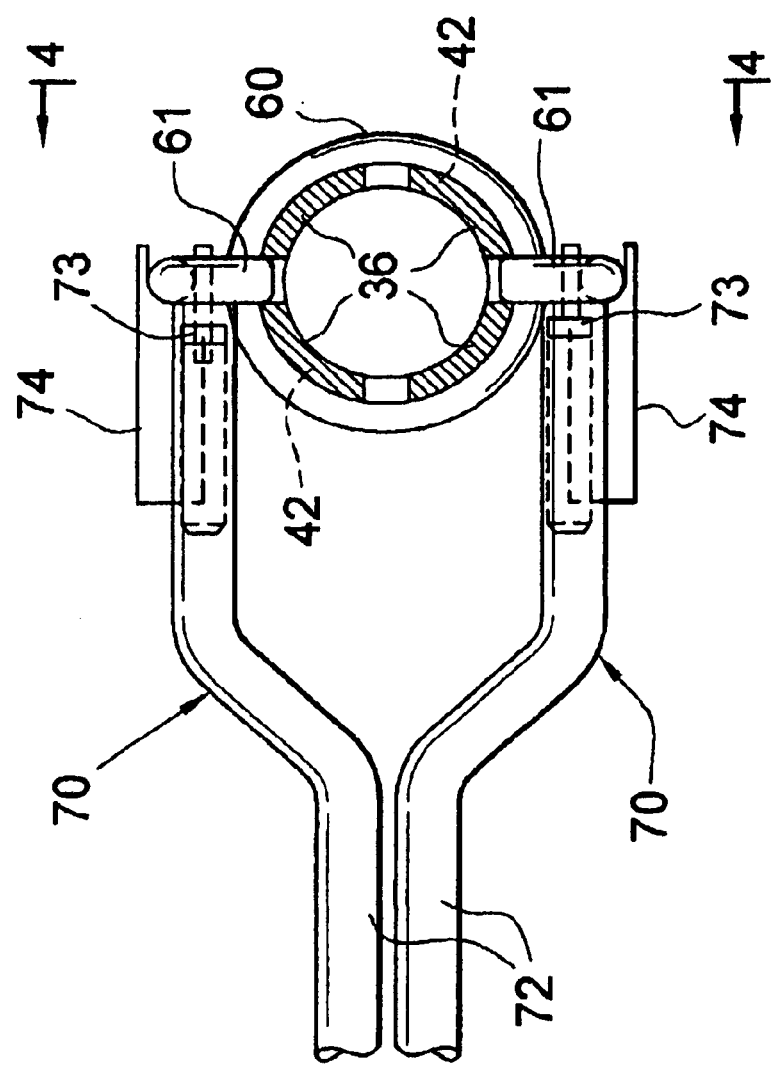
FIG. 3 is a fragmentary sectional view thereof showing the drain and pipe releasably locked together, taken along the line 3—3 of FIG. 1.
Figure 4:
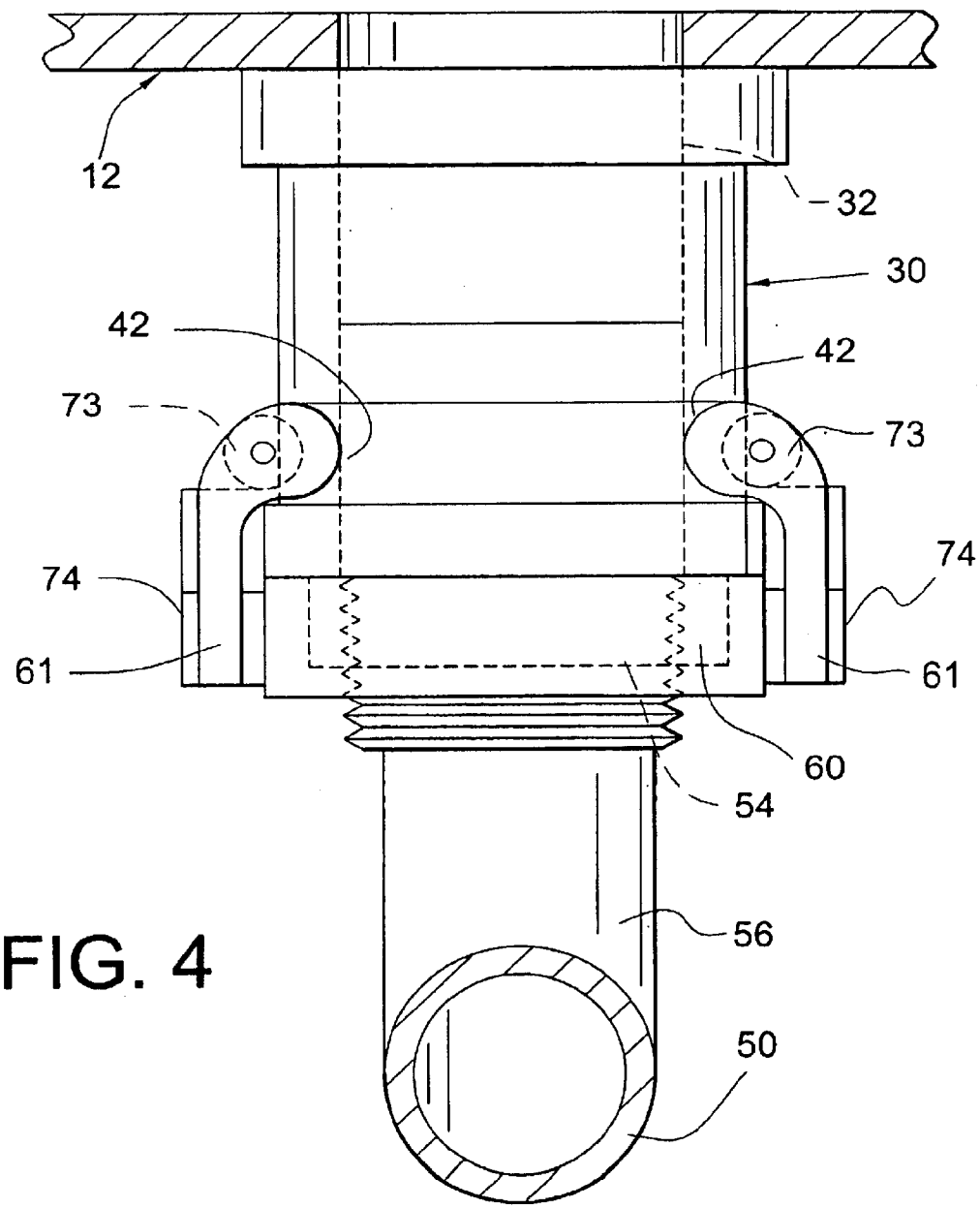
FIG. 4 is a fragmentary sectional view thereof, taken along the line 4—4 of FIG. 3.

The mechanism 60 is preferably a part of a conventional metal cam-and-groove hose coupling, commonly referred to as a "QUICK-CONNECT" or "CAM-LOCK" connection. A preferred mechanism 60 is a female connector such as that available under the trade name DIXON ANDREWS CAM AND GROOVE TYPE D COUPLER from Salco Products or McMaster-Carr. It is similar to the mechanism normally used in the prior art at the end of the flexible hose for connection to the male adapter 36 and defines at least one pivotable cam 61 (two opposed cams 61 being illustrated) for releasable locking engagement with the groove 42 of male adapter 36 at the end of the drain 30. The cam(s) 61 act as the second element(s) of the engagement means and releasably lock together with the groove 42 acting as the first element of the engagement means, as illustrated in FIGS. 3 and 4. The mechanism 60 is preferably formed of aluminum to maintain the lightweight nature of the unloading assembly 14.

Preferably the pipe 50 includes adjacent the end 52 a ball valve 62 which is normally closed during the unloading procedure, but is manually opened after the unloading procedure terminates so that the pipe 50 may be drained of the flowable material prior to disconnection of the mechanism 60 and the drain 30. The unloading assembly 14 is then ready for storage without making a mess (that is, without the flowable material draining therefrom in the storage location).

It will be appreciated by those skilled in the art that, while the mechanism 60 has been described and shown herein as having a free female end and the drain 30 has been described and shown herein as having a free male end (with the free female and male ends being configured and dimensioned to releasably engage), it is within the principles of the present invention to have a mechanism 60 with a free male end and a drain 30 with a free female end (provided again that the free female and male ends are configured and dimensioned to releasably engage).

In order to ensure that the mechanism 60 at the pipe end 54 remains engaged with the male adapter 36 at the end of drain 30, thereby to enable safe product communication between the interiors of the transport 12 and the pipe 50, means are provided to ensure the continuity of the engagement until product flow is intentionally terminated. To this end, the unloading assembly 14 additionally includes at least one pole, generally designated 70. The pole 70 includes a pole body 72 extending between the pole ends 73, 76 substantially parallel and adjacent to the pipe body 56. Pole body 72 is preferably shorter than pipe body 56. Pole end 73 is supported by bracket 74 of mechanism 60, adjacent the pipe end 54, and controls the orientation of the second element of the engagement means (cam 61) for engagement with or disengagement from the first element thereof (groove 42). A bent end 76 of the pole 70, disposed adjacent the pipe end 52 (near the grip 58), provides manually operable means for at least partially rotating the pole 70 about its longitudinal axis and thereby causing the cam 61 to releasably engage or disengage from groove 42.

Figure 5:
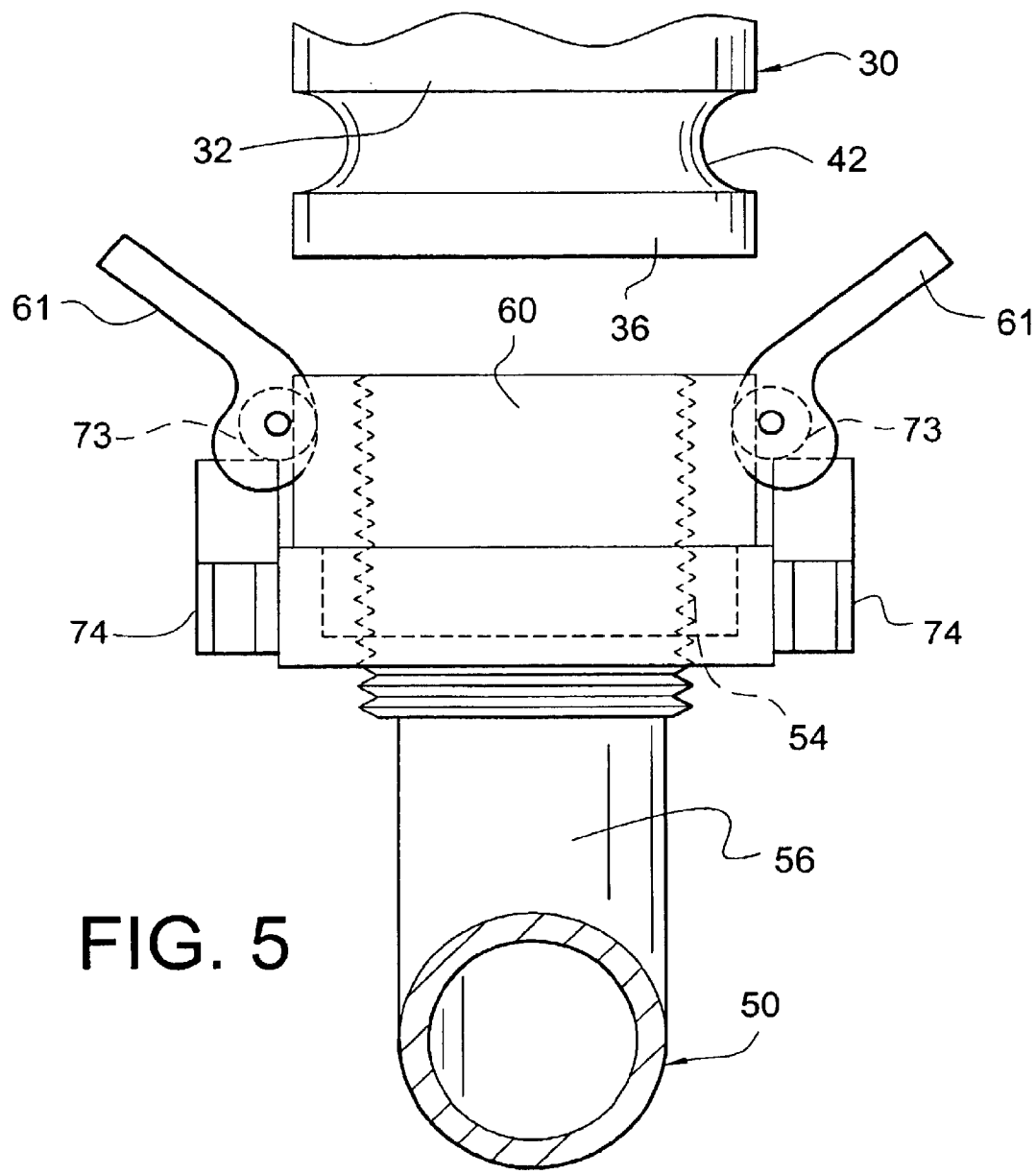
FIG. 5 is a view similar to FIG. 4 but showing the unloading assembly and drain prior to engagement.

Accordingly, pole end 76 operates the cam attachment system of the mechanism 60 to releasably lock or unlock the engagement thereof with the male adapter 36. Thus, a person disposed adjacent the aforementioned lateral side 12c of transport 12 can releasably lock together (or unlock) the mechanism 60 and the drain 30 by using the bent pole end 76 to cause the cam(s) 61 and the groove 42 to cooperatively and releasably lock together, without crawling under the transport bottom 12b. As illustrated in FIG. 5, in one position of the bent pole end 76, the cam 61 does not enter the groove 42 so that there is no interference with movement of the unloading assembly 14 relative to the transport 12. As illustrated in FIGS. 3 and 4, in the other position of the bent pole end 76, the cam 61 enters groove 42 such that the latter precludes the pipe 50 from moving relative to the drain 30 and thus maintains the engagement between the mechanism 60 of pipe 50 and the male adapter 36 of drain 30.

Clearly more complex and sophisticated engagement maintaining means may be employed to the same end, but that illustrated and described herein is simple and effective for its intended purpose.

Preferably, the unloading assembly 14 has a pair of the poles 70. Each of the pair of poles 70 has a pole body 72 substantially parallel and adjacent to a respective side of the pipe body 56. Each bent pole end 76 causes a respective cam 61 at pole end 73 to releasably engage or release from the groove 42 of the transport drain 30. Thus the pair of cams 61 and the groove 42 cooperatively and releasably lock together the pipe 50 and the drain 30 to maintain engagement of the female mechanism 60 and the male adapter 36 during product flow. The use of two poles 70, as opposed to only one, ensures a tighter, more secure and safer engagement of the unloading assembly 14 and the transport 12. A removable locking bar 82 enables the bent-down ends 76 of the poles 70 to be releasably locked together against accidental rotation out of such engagement.

It will be appreciated that, while in each pole 70 the pole body 72 extends substantially parallel and adjacent to pipe body 56, the pole body 72 need not be linear and may define various bends as necessary to enable the poles 70 to pass around any otherwise interfering structure on the bottom of the transport 12, such as the brake rods (not shown) of the transport 12.

A brace plate 80 of generally triangular configuration, with the apex at the bottom being truncated, is secured atop the pipe 50 adjacent the grip end 52. The brace plate 80 is apertured for passage therethrough of the pipe body 56 and the pole 70 (or both poles 70, when present) so as to maintain the appropriate juxtaposition of the aforementioned elements for locking of the mechanism 60 to male adapter 36 as well as to permit handling of the unloading assembly 14 as a single unit. To facilitate rotation of the poles 70 within the brace plate 80, the poles 70 may be provided with locking collars (not shown) at an appropriate point doing their lengths.

The full length of the unloading mechanism 14 is generally about 7 feet, and it weighs about 35–55 pounds. The pipe is preferably about 2 inches in diameter and made of aluminum, while the poles 70 are preferably about 0.5 inch in diameter and made of stainless steel piping. The brace plate 80 is preferably formed of one-eighth inch thick aluminum plate.

While every attempt is made to keep the unloading mechanism 14 lightweight, its length of about 7 feet makes it rather unwieldy, and this presents difficulties when attempting to engage the mechanism 60 with the drain 30 by manipulation of the grip pipe end 52. In order to solve this problem, a support, generally designated 90, is pivotally secured to the pipe body 56 adjacent the pipe grip end 52 and intermediate the brace plate 80 and the mechanism 60. In the use orientation illustrated in FIG. 1, the support 90 is substantially upright and extends upwardly from the pipe body 56. Adjacent its upper end, the support 90 defines fastener means 92 for releasably engaging the first fastener-receiving means 40 of the transport 12. As illustrated, the fastener means 92 may simply be a series of saw teeth adapted to engage the fastener-receiving means 40 so that, in effect, the transport 12 supports the pipe 50 at the junction 94 of the pipe body 56 and the support end 90.

As the junction is pivotable in nature, it allows manipulation of the pipe body 56 in at least a vertical plane such that the mechanism 60 may be easily brought up to or down from the drain 30 by manipulation of the pipe grip end 52. Thus the support 90 leaves the mechanism 60 free to move (at least in a vertical plane) relative to the drain 30 for engagement therewith or disengagement therefrom. To facilitate compact storage of the unloading assembly 14 when it is not in use, the pivotable nature of the junction between the support 90 and the pipe body 56 enables pivoting of the support 90 between a storage orientation (see FIG. 1) substantially parallel to the pipe body 56 and a use orientation (see FIG. 2) substantially perpendicular to the pipe body 56.

While the junction 94 of support 90 and pipe body 56 is closer to the pipe grip end 52 than the pipe mechanism end 54, the exact disposition of the junction along the length of the pipe body 56 may be determined at least in part by the desire to be able to roughly balance the pipe body 56 at the junction 94, thereby to facilitate upward and downward movement of the mechanism 60 relative to the drain 30. This in turn may dictate an appreciable spacing, as illustrated, between the junction 94 and the adjacent grip end 52 of pipe body 56.

To summarize, the present invention provides an unloading assembly which can be operatively connected with the transport, and in particular the drain of a railcar, without anyone having to crawl under the transport to connect (or disconnect) the unloading assembly and the transport. Accordingly, the unloading procedure can be accomplished easier, faster and with greater perceived and actual safety. The unloading assembly is inexpensive and simple to manufacture, use and maintain.

Now that the preferred embodiments of the present invention have been shown and described in detail, various modifications and improvements thereon will become readily apparent to those skilled in the art. Accordingly, the spirit and scope of the present invention is to be limited only by the appended claims, and not by the foregoing specification.

I claim:

1. An unloading system comprising in combination:
   (A) an axially extending transport for flowable product including:
      (i) a hollow drain extending downwardly from the bottom of said transport and defining a first element of an engagement means, said drain being spaced above the ground and inwardly from at least one lateral side of said transport; and
      (ii) fastener-receiving means adjacent said one lateral side of said transport; and
   (B) an unloading assembly including:
      (i) a rigid hollow pipe defining a pair of opposed pipe ends and a pipe body extending between said pipe ends, one said pipe end defining a second element of said engagement means and a mechanism engageable with said drain to enable product communication between the interiors of said transport and said pipe;
      (ii) a support secured to said pipe body adjacent said other pipe end, said support including fastener means for releasably engaging said fastener-receiving means of said transport such that said transport substantially supports said pipe body while leaving said mechanism on said one pipe end free to move in at least a vertical plane relative to said drain prior to engagement therewith; and
      (iii) at least one pole defining a pair of opposed pole ends and a pole body extending between said pole ends, one said pole end located adjacent said other pipe end defining manually operable means for rotating said pole about its longitudinal axis, and the other said pole end adjacent said one pipe end defining means for rotating said second element relative to said first element, thereby to cause said second element to releasably engage said first element;
         whereby said first and second elements cooperatively releasably lock together said mechanism and said drain upon suitable rotation of said pole.

2. The unloading system of claim 1 wherein said drain includes flow control means movable between an open orientation enabling flow of the product out of said transport via said drain and a closed orientation precluding flow of the product out of said transport via said drain, said flow control means being operatively connected to means for moving said flow control means between said open and closed orientations, said moving means being disposed adjacent said one lateral side of said transport.

3. The unloading system of claim 2 additionally including means for draining flowable product from said pipe after movement of said flow control means to the closed orientation, but prior to disengagement of said mechanism and said drain.

4. The unloading system of claim 1 wherein said support is pivotable between a storage orientation substantially parallel to said pipe body and a use orientation substantially perpendicular to said pipe body.

5. The unloading system of claim 1 wherein said pipe body has a length generally equal to the separation between said drain and said one lateral side of said transport.

6. The unloading system of claim 5 wherein said pole body is substantially parallel and adjacent to said pipe body and has a length less than that of said pipe body.

7. The unloading system of said claim 1 wherein said other pipe end defines a pair of said second elements, and said unloading assembly has a pair of said poles, each said pole having a pole body adjacent a respective side of said pipe body and means for rotating a respective one of said second elements relative to said first element;
   whereby said first element and said second elements cooperatively releasably lock together said one pipe end and said drain upon suitable rotation of said poles.

8. The unloading system of claim 7 additionally including means to lock said poles together against rotation.

9. The unloading system of claim 7 additionally including a brace plate for fixing the relative juxtaposition of said pair of poles and said pipe.

10. The unloading system of claim 1 wherein said mechanism has at least one pivotable cam operable as said second element by at least one said pole, and said drain has an external peripheral groove operable as said first element, said cam and groove being configured and dimensioned to releasably engage.

11. An unloading system comprising in combination:
   (A) an axially extending transport for flowable product including:
      (i) a hollow drain extending downwardly from the bottom of said transport and defining a first element of an engagement means, said drain being spaced above the ground and substantially inwardly from both lateral sides of said transport; said drain including flow control means movable between an open orientation enabling flow of the product out of said transport via said drain and a closed orientation precluding flow of the product out of said transport via said drain, said flow control means being operatively connected to means for moving said flow control means between said open and closed orientations, said moving means being disposed adjacent one lateral side of said transport; and
      (ii) fastener-receiving means adjacent said one lateral side of said transport; and
   (B) an unloading assembly including:
      (i) a rigid hollow pipe of substantial length defining a pair of opposed pipe ends and a pipe body extending between said pipe ends, one said pipe end defining a manual grip, and the other said pipe end defining a pair of second elements of said engagement means and a mechanism engageable with said drain to enable product communication between the interiors of said transport and said pipe, said pipe body having a length generally equal to the separation between said drain and said one lateral side of said transport;

(ii) a support secured to said pipe body adjacent said one pipe end, said support including fastener means for releasably engaging said fastener-receiving means of said transport such that said transport substantially supports said pipe body while leaving said mechanism on said other pipe end free to move in at least a vertical plane relative to said drain prior to engagement therewith, said support being pivotable between a storage orientation substantially parallel to said pipe body and a use orientation substantially perpendicular to said pipe body, and (iii) a pair of poles, each said pole defining a pair of opposed pole ends and a pole body extending between said pole ends extending substantially parallel and adjacent to said pipe body, one said pole end adjacent said one pipe end defining manually operable means for rotating said pole about its longitudinal axis, and the other said pole end adjacent said other pipe end defining means for rotating a respective one of said second elements relative to said first elements thereby to cause said second elements to releasably engage said first element;

(iv) means to lock said poles together against rotation;

(v) a brace plate for fixing the relative juxtaposition of said pair of poles and said pipe; and (vi) means for draining flowable product from said pipe after movement of said flow control means to the closed orientation, but prior to unlocking of said other pipe end and said drain;

said mechanism having at least one pivotable cam operable as said second element by at least one said pole, and said drain having an external peripheral groove operable as said first element, said cam and groove being configured and dimensioned to releasably engage;

whereby said first and second elements cooperatively releasably lock together said other pipe end and said drain upon suitable rotation of said poles.

12. An unloading system for use with an axially extending transport for flowable product including:

(a) a hollow drain extending downwardly from the bottom of said transport and defining a first element of an engagement means, said drain being spaced above the ground and substantially inwardly from both lateral sides of said transport; and (b) fastener-receiving means adjacent one lateral side of said transport;

said unloading assembly comprising:

(i) a rigid hollow pipe of substantial length defining a pair of opposed pipe ends and a pipe body extending between said pipe ends, one said pipe end defining a manual grip, and the other said pipe end defining a second element of said engagement means and a mechanism engageable with said drain to enable product communication between the interiors of said transport and said pipe;

(ii) a support secured to said pipe body adjacent said one pipe end, said support including fastener means for releasably engaging said fastener-receiving means of said transport such that said transport substantially supports said pipe body while leaving said mechanism on said other pipe end free to move in at least a vertical plane relative to said drain prior to engagement therewith; and (iii) at least one pole defining a pair of opposed pole ends and a pole body extending between said pole ends extending substantially parallel and adjacent to said pipe body, one said pole end adjacent said one pipe end defining manually operable means for rotating said pole about its longitudinal axis, and the other said pole end adjacent said other pipe end defining means for rotating said second element relative to said first element thereby to cause said second element to releasably engage said first element;

whereby said first and second elements cooperatively releasably lock together said other pipe end and said drain upon suitable rotation of said pole.

13. The unloading system of claim 12 wherein said drain includes flow control means movable between an open orientation enabling flow of the product out of said transport via said drain and a closed orientation precluding flow of the product out of said transport via said drain, said flow control means being operatively connected to means for moving said flow control means between said open and closed orientations, said moving means being disposed adjacent said one lateral side of said transport.

14. The unloading system of claim 12 wherein said support is pivotable between a storage orientation substantially parallel to said pipe body and a use orientation substantially perpendicular to said pipe body.

15. The unloading system of claim 12 wherein said pipe body has a length generally equal to the separation between said drain and said one lateral side of said transport.

16. The unloading system of said claim 12 wherein said other pipe end defines a pair of said second elements, and said unloading assembly has a pair of said poles, each said pole having a pole body adjacent a respective side of said pipe body and means for rotating a respective one of said second elements relative to said first element;

whereby said first element and said second elements cooperatively releasably lock together said other pipe end and said drain upon suitable rotation of said poles.

17. The unloading system of claim 16 additionally including means to lock said poles together against rotation.

18. The unloading system of claim 16 additionally including a brace plate for fixing the relative juxtaposition of said pair of poles and said pipe.

19. The unloading system of claim 12 wherein said mechanism has at least one pivotable cam operable as said second element by at least one said pole, and said drain has an external peripheral groove operable as said first element, said cam and groove being configured and dimensioned to releasably engage.

20. The unloading system of claim 12 additionally including means for draining flowable product from said pipe after movement of said flow control means to the closed orientation, but prior to disengagement of said mechanism and said drain.

* * * * *